(12) United States Patent
Sauter

(10) Patent No.: US 7,434,896 B2
(45) Date of Patent: Oct. 14, 2008

(54) METHOD AND DEVICE FOR BRAKE CONTROL IN A VEHICLE DURING THE STARTING PROCESS

(75) Inventor: Thomas Sauter, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 10/517,554

(22) PCT Filed: Mar. 24, 2003

(86) PCT No.: PCT/DE03/00960

§ 371 (c)(1),
(2), (4) Date: Dec. 30, 2005

(87) PCT Pub. No.: WO04/000619

PCT Pub. Date: Dec. 31, 2003

(65) Prior Publication Data

US 2006/0108865 A1    May 25, 2006

(30) Foreign Application Priority Data

Jun. 20, 2002  (DE) ................... 102 27 520

(51) Int. Cl.
*B60T 8/60* (2006.01)
*B60T 8/32* (2006.01)

(52) U.S. Cl. ............... 303/149; 303/150; 303/192; 701/73

(58) Field of Classification Search ........... 303/170, 303/149, 150, 192, 191, 148, 139, 143, 144; 701/73, 82, 83
See application file for complete search history.

(56) References Cited

U.S. PATENT DOCUMENTS

| | | | | |
|---|---|---|---|---|
| 4,349,876 A | * | 9/1982 | Lindemann | 701/73 |
| 5,058,018 A | * | 10/1991 | Kuwana et al. | 701/73 |
| 5,119,303 A | * | 6/1992 | Struck et al. | 701/73 |
| 5,123,715 A | * | 6/1992 | Okubo | 303/150 |
| 5,322,356 A | * | 6/1994 | Kolbe et al. | 303/139 |
| 5,511,865 A | * | 4/1996 | Howell | 303/139 |
| 5,520,448 A | * | 5/1996 | Okubo | 303/148 |
| 5,820,229 A | * | 10/1998 | Pueschel | 303/139 |
| 5,979,995 A | * | 11/1999 | Miyazaki | 303/112 |
| 6,533,367 B1 | * | 3/2003 | Latarnik et al. | 303/139 |
| 6,554,744 B2 | * | 4/2003 | Schmidt | 477/208 |

(Continued)

FOREIGN PATENT DOCUMENTS

DE    44 18 771    10/1995

(Continued)

OTHER PUBLICATIONS

Patent Abstracts of Japan, vol. 2002, No. 09, Sep. 4, 2002 & JP 2002 145034 A (Robert Bosch GmbH), May 22, 2002.

*Primary Examiner*—Thomas J Williams
(74) *Attorney, Agent, or Firm*—Kenyon & Kenyon LLP

(57) ABSTRACT

A method for brake regulation in a vehicle when driving off on a split-μ roadway is provided, in which method the presence of a drive-off procedure on a split-μ roadway having a high coefficient of friction side and a low coefficient of friction side is recognized, and as a result, the brake pressure on a driven wheel on the high coefficient of friction side of the vehicle is increased.

2 Claims, 2 Drawing Sheets

U.S. PATENT DOCUMENTS

| | | | |
|---|---|---|---|
| 6,585,070 B1 * | 7/2003 | Hessmert et al. | 180/197 |
| 6,681,168 B2 * | 1/2004 | Polzin | 701/83 |
| 6,729,697 B2 * | 5/2004 | Yasui et al. | 303/150 |
| 6,816,769 B2 * | 11/2004 | Polzin | 701/73 |
| 2003/0214181 A1 * | 11/2003 | Polzin | 303/142 |
| 2003/0216851 A1 * | 11/2003 | Trefzer et al. | 701/73 |

FOREIGN PATENT DOCUMENTS

| | | |
|---|---|---|
| DE | 198 49 407 | 12/1999 |
| DE | 199 16 096 | 10/2000 |
| DE | 199 33 085 | 1/2001 |
| DE | 199 50 477 | 4/2001 |
| DE | 100 53 608 | 8/2002 |
| DE | 10053608 * | 8/2002 |
| JP | 09315275 A * | 12/1997 |

* cited by examiner

METHOD AND DEVICE FOR BRAKE CONTROL IN A VEHICLE DURING THE STARTING PROCESS

FIELD OF THE INVENTION

The present invention relates to a method and a device for brake regulation.

BACKGROUND INFORMATION

When driving off on a slope which is inclined upward in the direction of travel (uphill slope), a driver is often able to estimate, based on experience, the engine torque to be set using the accelerator in order to drive off.

If, however, there are different coefficients of friction on this slope between the right and left sides of the vehicle (split-μ uphill slope), then driving off the vehicle without traction aid is almost impossible for a corresponding slope, since the wheel on the side of the lower coefficient of friction starts spinning. Depending on the gradient, the vehicle may even roll backward on the slope.

When driving off on a split-μ uphill slope using traction aid (e.g., TCS) the driver must set a higher engine torque to drive off the vehicle. The spinning wheel on the low-μ side is braked by the TCS (traction control system) via the brake intervention, and a driving torque of the magnitude of the braking torque is transmitted to the wheel situated on the high-μ side, making it possible to drive the vehicle forward. This transmission of the driving torque is an effect of the coupling of the wheels via a differential. The required braking torque (locking torque) on the low-μ side must be applied via the driver's action as an additional engine torque.

Since the driver is often not aware of these physical relationships when driving off on a split-μ uphill slope, the driver relies on intuition and sets an engine torque that is too low. Upon noticing that the vehicle does not start moving, the driver gradually increases the torque until the vehicle starts moving.

If the driving torque set is so low that the wheel on the low-μ side does not immediately run with a high degree of slip, the pressure builds up hesitantly, resulting in the vehicle starting to roll backward. To prevent it from rolling backward, the driver must quickly give more gas to increase the driving torque and consequently the locking torque (via the TCS brake intervention). This response, however, is unnatural to the driver who, instead of giving more gas, will be startled and actuate the brake, interrupting the drive-off sequence.

Roll-back may also occur if the braking torque (locking torque) is built up with a delay due to wheel vibrations. At low temperatures brake pressure buildup also often does not take place quickly enough to prevent the vehicle from rolling backward.

SUMMARY OF THE INVENTION

The present invention provides a method for brake regulation in a vehicle when driving off on a split-μ roadway, in which:
the presence of a drive-off procedure on a split-μ roadway having a high coefficient of friction side and a low coefficient of friction side is recognized, and
as a result, the brake pressure on a driven wheel on the high coefficient of friction side of the vehicle is increased.

One advantage of the present invention is that driving off is substantially facilitated, e.g., for an inexperienced driver, using simple means, namely by increasing the brake pressure on a driven wheel on the high coefficient of friction side of the vehicle. The present invention is implementable in a control unit for traction control (TCS) without any substantial cost, in particular without any cost for sensors.

An example embodiment provides that the brake pressure is increased by a constant value. This measure is particularly simple to implement.

A further example embodiment provides that the subsequent reduction of the increased brake pressure is a function of whether the split-μ roadway is inclined upward in the direction of the longitudinal axis of the vehicle, i.e., on whether there is a split-μ uphill slope. This ensures that on a level or slightly inclined roadway the brake pressure is reduced more quickly, which has a positive effect on the ride comfort.

An additional example embodiment provides that:
the time interval between the driver actuating the accelerator to initiate the drive-off procedure and the beginning of movement of the vehicle is determined, and
the subsequent reduction of the increased brake pressure is a function of the time interval thus determined.

This time interval is a simple measure for determining whether the drive-off procedure is taking place on a level roadway or on an inclined roadway.

An additional example embodiment provides the brake pressure:
being increased by a first constant value if the parking brake is not actuated by the driver, and
being additionally increased by a second constant value if the parking brake is actuated by the driver.

If the driver actuates the parking brake when driving off, it can be assumed with a high degree of certainty that the vehicle is being driven off uphill. Therefore, it is advisable to increase the brake pressure again by an additional value when the actuation of the parking brake has been recognized.

The brake control device in a vehicle when driving off on a split-μ roadway includes:
recognition unit for recognizing the presence of a driving-off procedure on a split-μ roadway having a high coefficient of friction side and a low coefficient of friction side, and
brake pressure increasing unit for increasing the brake pressure on a driven wheel on the high coefficient of friction side of the vehicle as a result of the presence, recognized by the recognition means, of a driving-off procedure on a split-μ roadway having a high coefficient of friction side and a low coefficient of friction side.

DETAILED DESCRIPTION

To prevent a vehicle from rolling back on a split-μ uphill slope, according to the present invention, when a split-μ roadway is recognized not only is active brake pressure actively built up on the spinning driven wheel (as provided by the TCS), but brake pressure is also applied on the driven wheel on the high coefficient of friction side (although it exhibits no system deviation, i.e., no excessive wheel slip) as a preventive measure. The procedure takes place in three steps:

Step 1: A split-µ uphill slope is recognized;
Step 2: The required brake pressure on the high-µ wheel is computed;
Step 3: Pressure on the high-µ wheel is decreased in a controlled manner.

The individual steps are described in detail below.

Step 1: A Split-µ Uphill Slope is Recognized.

A split-µ uphill slope is recognized when the following conditions are met:
1. The engine torque specified by the driver (MAF) exceeds a limiting value MaMueSplit;
2. There is "select high regulation" and a one-sided system deviation and rapid brake pressure buildup;
3. There is a high one-sided slip;
4. Differential braking torque M_Diff between the right and left driven wheels exceeds a limiting value MbrakeMueSplit;
5. There is a driving-off procedure.

In "select high regulation" the slip thresholds of the driving torque regulation (engine intervention) are switched to insensitive. This means that the engine deliberately works against the brakes to move the vehicle forward.

If all these conditions are met, the required brake pressure P_HighWheel is calculated for the wheel on the high-µ side (=high coefficient of friction side) to prevent the vehicle from rolling backward.

The steeper the slope, the greater the likelihood of a driver using the parking brake to drive off. Therefore, if the driver uses the parking brake to drive off the vehicle, it may often be assumed that the vehicle is on an uphill slope.

Therefore, if the above-mentioned conditions are met and the driver additionally uses the parking brake to drive off the vehicle, computed brake pressure P_HighWheel for the wheel on the high-µ side (also known as the "high-µ wheel") is additionally increased by an offset value P_HasOffset, i.e., the equation $$P\_HighWheel = P\_HighWheel + P\_HasOffset$$

applies.

Step 2: The Required Brake Pressure on the High-µ Wheel is Computed.

Figure 1:
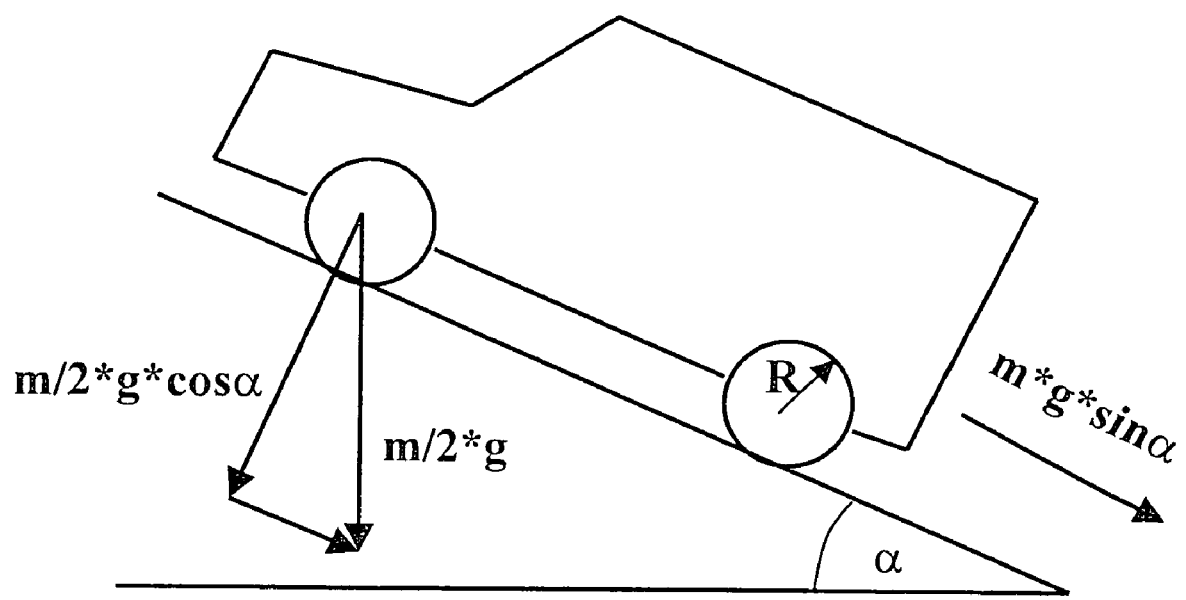
FIG. 1 shows a vehicle and the forces acting upon it on an uphill slope.

In the following, the computation of required brake pressure P_HighWheel is presented. FIG. 1 is a schematic illustrating this procedure, which shows the force of gravity m*g/2 acting on the wheels of the driven axle (the front axle in the figure), as well as its components m*g/2*cos α, i.e., the normal force acting perpendicularly to the roadway, and the downgrade force m*g*sin α.

For this purpose, the downgrade torque MWS is determined first:

$$MWS = m*g*R*\sin \alpha,$$

where
M=vehicle mass in kg
g=gravity acceleration constant (9.81 M/s$^2$)
sin α=sine of the slope angle
R=wheel radius.

The maximum transmissible torque Mtransmissible is determined via the coefficient of friction. For vehicles having single-axle drives Mtransmissible=µ*m/2*g*R*cos α, where
µ=coefficient of friction m/2=half of vehicle mass, since only one of the two axles is driven (rear or front drive). A vehicle mass evenly distributed between the front axle and rear axle is assumed.

To determine the maximum possible slope as a function of the coefficient of friction, the two equations must be combined: MWS=Mtransmissible, i.e., $$m*g*\sin \alpha*R = \mu*m/2*g*R*\cos \alpha.$$

This yields $$\tan \alpha = \mu/2.$$

For typical split-µ conditions, the coefficient of friction on the low-µ side is approximately 0.2 (ice) and on the high-µ side approximately 0.8 to 1, for example. However, the low-µ side is the determining factor for driving off the vehicle on a slope. Assuming a coefficient of friction of p=0.2, the resulting angle is α=arctan(0.1)=5.7°. This corresponds to a slope of approximately 10% (a 10% slope corresponds to arctan (0.1) and thus α=arctan(0.1)=5.7°).

This means that for a coefficient of friction of 0.2, driving off on a slope of up to 10% is possible in theory. This, however, assumes that the driver sets the engine torque required immediately. Also in this case, a very low excess torque causes the low-µ wheel to spin, and the coefficient of friction is further reduced with the transition from static friction to slipping friction with the result that the vehicle rolls backward.

The illustrative computing example of a vehicle having a mass m=1500 kg is described below. The wheel diameter is 0.6 m. Furthermore, there is a split-µ uphill slope having a gradient of 15% (thus α=arctan(0.15)=8.5°). The coefficients of friction are 0.2/1.0, i.e., µ=0.2 on the low-µ side, and µ=1.0 on the high-µ side.

For the main downgrade torque MWS $$MWS = 1500 \text{ kg}*9.81 \text{ m/s}^2*\sin(8.5)*0.3 \text{ m} = 650 \text{ Nm}.$$

This yields a transmissible torque of $$M\text{transmissible} = 0.2*750 \text{ kg}*9.81 \text{ m/s}^2*0.3 \text{ m}*\cos(8.5°) = 440 \text{ Nm}$$

The resulting difference is 210 Nm.

By applying a braking torque to the low-µ wheel, however, the transmissible torque on the high-µ wheel may be increased via the differential.

The difference in the amount of Mdelta=210 Nm must therefore be applied as an additional braking torque. The braking torque to be applied via the driven axle is evenly distributed between the two driven wheels.

The additional braking torques for the low-µ side and the high-µ side therefore result as:

$$M\text{brakeAddLowWheel} = M\text{delta}/2 = 105 \text{ Nm, and}$$

$$M\text{brakeAddHighWheel} = M\text{delta}/2 = 105 \text{ Nm}.$$

Since, when driving off on an uphill slope, high brake pressure is applied to the slipping low-µ wheel anyway, the additional braking torque MbrakeAddHighWheel must only be applied to the high-µ wheel.

The relationship between the brake pressure and braking torque is determined from $$M\text{brake}[Nm] = C[Nm/bar]*p\text{brake}[bar].$$

The physical units of measurement of the respective variables are given in square brackets [ ]. If constant C assumes the value of 12.5 Nm/bar, for example, then the following brake pressure pHighWheel results on the high-µ wheel:

$$p\text{HighWheel} = M\text{brakeAddHighWheel}/C = 8.4 \text{ bar}.$$

The parameters in a vehicle may be designed such, for example, that a brake pressure for a 15% gradient is supplied to the brake associated with the high-µ wheel when a split-µ uphill slope is recognized. In connection with a parking brake switch, an offset value in the amount of 5 bar, for example, is added to this computed value.

Step 3: Controlled Pressure Reduction:

After the split-μ has been recognized, the pressure is always initially built up as if the vehicle were on an uphill slope. It is irrelevant whether the slope is 10% or 20%, since the downgrade force must be counteracted in any case.

The case is different on a level split-μ roadway (no slope). Although an applied brake pressure of 10 bar, for example, reduces the forward drive only insignificantly, it is, however, sensed by the driver. For this reason, the pressure must be reduced adaptively. The pressure reduction rate (i.e., change in pressure per unit of time) is a function of the certainty about the status. In particular, the pressure is reduced more rapidly in the event of a level split-μ roadway, and the pressure is reduced gradually in the event of a split-μ roadway on an uphill slope.

In split-μ regulation, conclusions may be drawn about the variation of the regulation over time and about the vehicle response. If the driver steps on the accelerator in the event of a level split-μ roadway, the vehicle responds very rapidly. The time interval between actuating the accelerator and the vehicle beginning to move is usually less than one second. However, on an uphill slope the vehicle usually starts moving after periods of between 2.5 to 4 seconds.

Therefore, it is advisable to reduce the pressure immediately when the vehicle starts moving within one second after a split-μ roadway has been recognized and the brake pressure has been actuated. Otherwise the pressure is reduced as soon as the speed of the low-μ wheel decreases again, i.e., as soon as the wheel acceleration becomes negative. This pressure reduction takes place via a pressure reduction ramp whose gradient (steepness) is adjustable.

Figure 2:
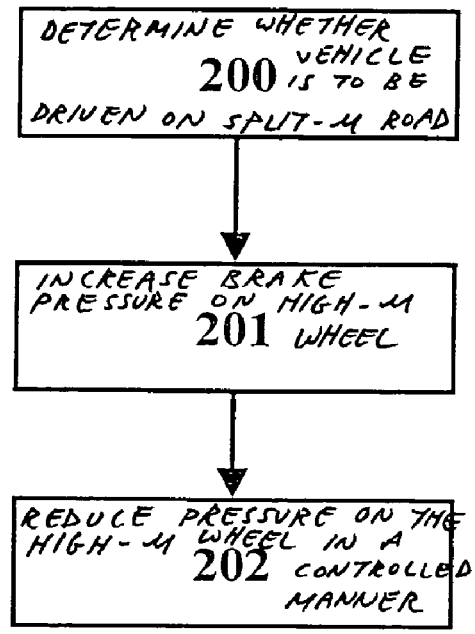
FIG. 2 shows the basic sequence of the method according to the present invention.

The basic sequence of the procedure is illustrated in FIG. 2. Block 200 determines whether the vehicle is to be driven off on a split-μ roadway. Subsequently, the method continues in block 201, where the brake pressure on the high-μ wheel is increased. The method continues in block 202, where the pressure on the high-μ wheel is reduced in a controlled manner.

Figure 3:
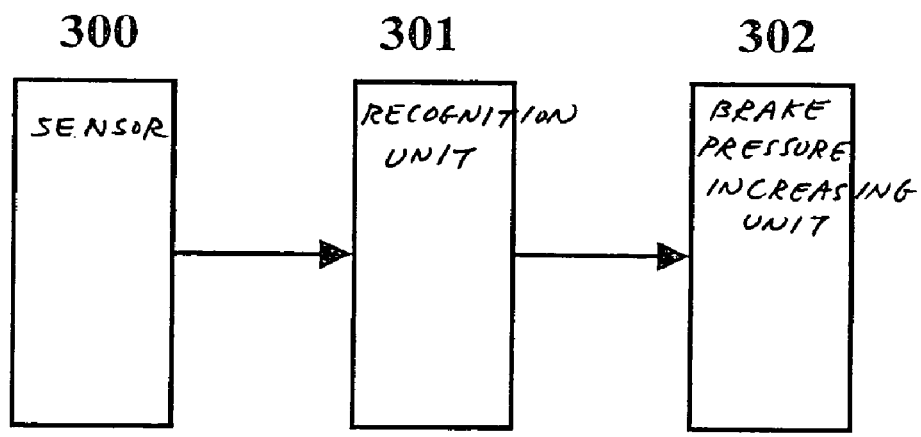
FIG. 3 shows the basic design of the device according to the present invention.

FIG. 3 shows the basic design of the device according to the present invention. Block 300 contains sensor means, which detect the accelerator position, the parking brake position, etc., for example. The output signals of these sensor means are relayed to recognition unit 301, which recognizes whether the vehicle is to be driven off on a split-μ roadway. The output signals of block 301 are relayed to brake pressure increasing unit 302, which is used for increasing the brake pressure on the high-μ wheel as needed.

What is claimed is:

1. A method of regulating brakes in a vehicle when driving off on a roadway having a first portion with a higher coefficient of friction than a second portion, comprising:

identifying that the vehicle is driving off on the roadway having a first portion with a higher coefficient of friction than a second portion; and increasing the brake pressure on a driven wheel on the portion of the roadway having the higher coefficient of friction;

wherein the brake pressure on the driven wheel on the portion of the roadway having the higher coefficient of friction is increased by a first constant value if a parking brake of the vehicle is not actuated by the driver, and wherein the brake pressure on the driven wheel on the portion of the roadway having the higher coefficient of friction is increased by a second constant value higher than the first constant value if the parking brake is actuated by the driver.

2. A device for brake regulation in a vehicle when driving off on a roadway having a first portion with a higher coefficient of friction than a second portion, comprising:

a recognition unit for recognizing that the vehicle is driving off on the roadway having a first portion with a higher coefficient of friction than a second portion; and a brake pressure increasing unit for increasing the brake pressure on a driven wheel on the portion of the roadway having the higher coefficient of friction once the recognition unit recognizes that the vehicle is driving off on the roadway having a first portion with higher coefficient of friction than a second portion;

wherein the brake pressure is increased by a first constant value if a parking brake is not actuated by the driver, and wherein the brake pressure is additionally increased by a second constant value if the parking brake is actuated by the driver.

* * * * *